C. E. AKELEY.
CAMERA LENS HOLDER.
APPLICATION FILED APR. 12, 1918.

1,300,806.

Patented Apr. 15, 1919.
2 SHEETS—SHEET 1.

INVENTOR
C. E. Akeley
BY
Kerr, Page, Cooper & Hayward
ATTORNEY

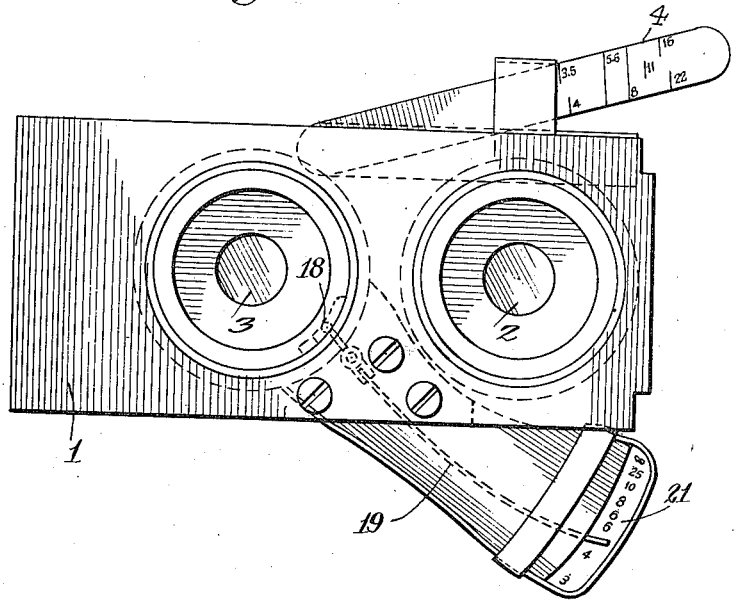

UNITED STATES PATENT OFFICE.

CARL E. AKELEY, OF NEW YORK, N. Y.

CAMERA LENS-HOLDER.

1,300,806.   Specification of Letters Patent.   Patented Apr. 15, 1919.

Application filed April 12, 1918. Serial No. 228,094.

*To all whom it may concern:*

Be it known that I, CARL E. AKELEY, a citizen of the United States, residing at New York, county and State of New York, have invented certain new and useful Improvements in Camera Lens-Holders, of which the following is a full, clear, and exact description.

The invention for which I now present a descriptive specification and claims, is an improvement in lens holders for cameras, and more especially for motion picture cameras by reason of the presence therein of certain properties and accessories which adapt it particularly for such purpose.

A lens holder which will permit of the adjustment of a lens or lenses, has long been a problem with camera makers, and, I believe, had not been solved practically and satisfactorily until I devised and produced the form now under consideration. This is a fact recognnized in the art and the reasons therefor require no extended elaboration beyond the statement that the construction of the ideal lens holder should be extremely simple and compact, that the number of parts should be reduced to a minimum and that facility of operation should be a dominating feature.

Recognizing these prerequisites and seeking to realize them I have produced a lens holder of the following general character. I employ a cylinder of resilient metal such as hard brass that is made permanently a part of a plate to be secured to a camera. This cylinder is slotted longitudinally to form somewhat narrow divisions and a certain number of the slots, three generally is sufficient, are made of substantial width. Over this slotted cylinder I pass a smooth fitting brass cylinder threaded on its inner surface and having a circumferential gear on its outer surface. After the outer cylinder is slipped down over the other, the slotted divisions of the latter which have outwardly extending flanges are expanded to fit the outer cylinder and so that the flanges engage with its outer end and hold the two firmly together.

The lens holding tube is provided with exterior mutilated gears or longitudinal toothed sections, most conveniently produced by threading its entire exterior surface and then milling the teeth off between the sections left, and these latter are of a width to fit closely in the enlarged slots in the inner cylinder, so that the lens tube may be inserted into the said cylinder until the toothed segments engage with the threads on the inner surface of the outer cylinder. By turning the latter, therefore, as by some device engaging with the outside circumferential gear, the lens tube is moved in or out of the slotted cylinder, and in this way its adjustment may be secured readily and with great nicety.

In illustrating this improvement I have shown it in a form for use with motion picture cameras, associated with a finder lens of substantially the same construction and other accessories which the nature of that particular work render necessary or desirable.

Fig. 3 is a view in elevation of the rear of the lens holders.

Fig. 4 is a sectional view on the line 4—4 of Fig. 1.

Fig. 5 is a broken section mainly on line 5—5 of Fig. 1, and

Fig. 6 is a view of the lens holding tube.

Figure 1:
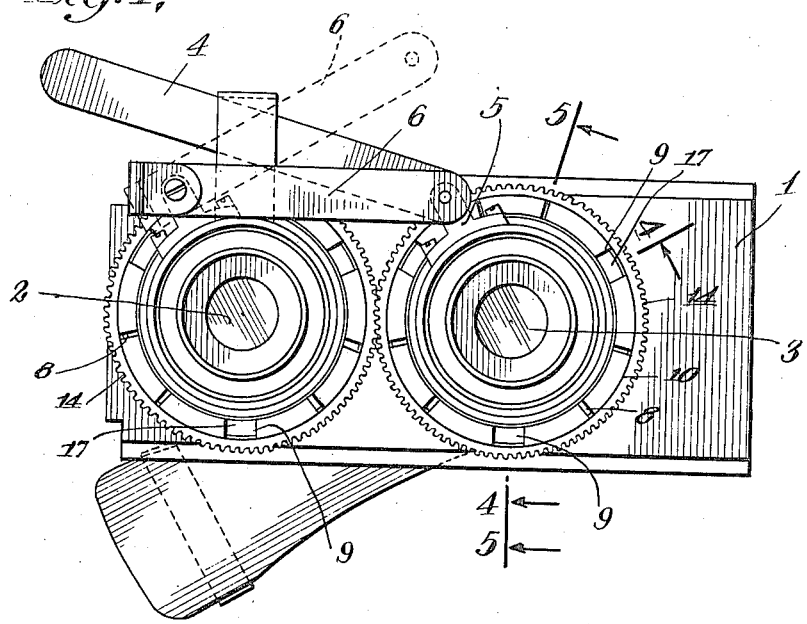
Figure 1 is view in elevation of the front of the device complete.
Figure 2:
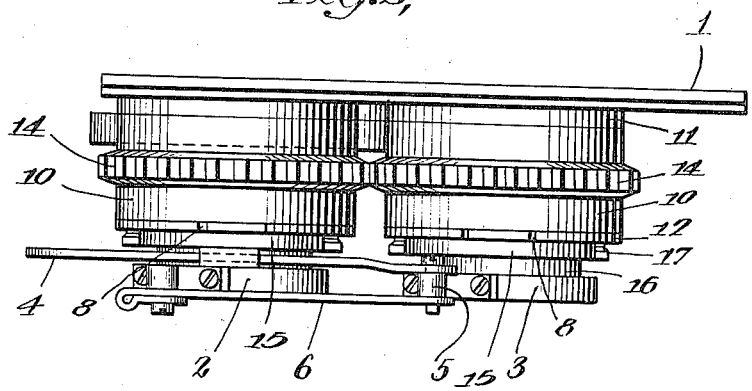
Fig. 2 is a top plan view of the same.

Referring to Fig. 1, the two lenses and their holders, above referred to, are shown side by side secured to a plate 1. The numeral 2 indicates the finder lens and 3 the photographic objective. As indicated in Fig. 2, a flat strip or bar 4 is pivoted to a projection 5, which controls the aperture or opening of the diaphragm, and from the same projection extends a bar 6 to a similar device for the finder lens. This latter bar 6 may be detached from the projection 5, and raised, as indicated in Fig. 1 in case it be not desired to adjust the diaphragms of both lenses simultaneously. The special mechanism for this purpose is not further illustrated as it forms no part of my present invention and is a well known attachment for camera lenses.

Both lens holders are or may be of substantially the same construction, and I have therefore illustrated in detail that for the objective lens only. This is shown in Figs. 4, 5 and 6, and is constructed as follows: To the plate 1 is secured a brass cylinder 7 of an internal diameter to fit closely the lens tube, and this cylinder contains longitudinal slots 8, at least three of which marked 9 in Fig. 1 are of sufficient width to admit the rows of mutilated gears on the exterior of the lens holder. By reason of this construction the sections of the cylinder may be bent inward to permit the outer cylinder 10 to be passed down over it, until it encounters a ring 11, secured around the end of cylinder 7, or to the base of the same.

After these parts are associated the sections of the slotted cylinder 7 are expanded to fit snugly the inner wall of the outer cylinder 10, and as the end edges of the sections are flanged or stepped as shown at 12, Fig. 5, these flanges lie over the outer end of the cylinder 10 and hold the latter firmly in position against the ring 11.

The inner face of the cylinder 10 is threaded as shown at 13 in Fig. 5, and around its exterior is a raised circumferential gear 14. It will be understood that by hand or by gearing applied to the gear 14, the outer cylinder 10 may be freely turned about the inner slotted cylinder 7.

The lens holding tube proper 16 fits into a cylinder 15, which is preferably composed of brass and is primarily cast or fashioned with external threads 17. The latter, except at those points to correspond in dimensions and position with the wide slots 9 in the cylinder 7, are cut away by milling to reduce the diameter of the cylinder so that it fits snugly within the cylinder 7, when the rows of teeth enter the wide slots therein.

In associating these parts the lens holder is turned to the position in which its prominent gear teeth 17 enter the enlarged slots in cylinder 7, and thereby engage with the threads on the interior of cylinder 10. This being done it is manifest that by turning the cylinder 10 the position of the lens holder in the cylinder 7 may be adjusted with exactness to any extent that conditions of use may require.

After the cylinder 15 has entered cylinder 7 a given distance a pin 18, on the end of a pointer 19, pivoted to the plate 1 and passing into the cylinder 7, enters an inclined slot 20 in the cylinder 15, so that by the inward or outward movement of the cylinder the pointer 19 is moved over a scale 21 to thereby indicate the adjustment of the lenses. These parts are illustrated in detail in Fig. 3, which show that the scale is in such position as to be visible from the rear by the operator, who may be using the camera.

In the particular form of the device which I have shown with two lens holders, the gears 14 of each intermesh, so that when either is turned by any suitable gear or lens adjusting mechanism on the camera, both lenses will be simultaneously and similarly moved. It will be understood of course, that to accomplish this the threads on the cylinders must be right and left handed.

This apparatus is, I believe, as simple, substantial and as free from complication as it is possible to make a device of this nature which will accurately and efficiently meet the demands of practical use. Its details may be greatly modified without departure from the invention, and the improvements are not solely in the association of the two lenses but in the construction and mode of operation of each lens holder individually considered.

Having now described my invention what I claim is:

1. In an adjustable lens holder, in combination, a slotted cylinder adapted to be mounted on a camera, an internally threaded cylinder surrounding and interengaging with the same, and a lens holding tube fitting the slotted cylinder and having raised longitudinal threaded portions fitting in the slots and engaging with the threads on the interior of the outer cylinder, whereby rotation of the latter will adjust the lens.

2. In an adjustable lens holder, in combination, a slotted cylinder adapted to be mounted on a camera, an internally threaded cylinder fitting over the same and retained thereon by engaging flanges on the ends of the sections of the slotted cylinder, and a lens holding tube having narrow raised longitudinal rows of threads on its exterior adapted to enter slots in the inner cylinder and to engage with the threaded interior of the outer cylinder, whereby rotation of the latter will adjust the lens.

3. In a lens holder for cameras, in combination, a slotted brass cylinder adapted to be attached to a camera, the ends of the sections of which are formed with outwardly extending flanges, an outer cylinder with internal screw threads surrounding the slotted cylinder, which is expanded so that the flanges engage with the end of the threaded cylinder, and a lens tube with mutilated exterior screw threads adapted to fit the slotted cylinder when the threads thereon enter the slots and engage the threads in the inner surface of the outer cylinder.

4. In a lens holder, in combination, an inner and an outer cylinder, the former containing longitudinal slots and the latter interiorly screw threaded, a lens holding tube having exterior rows of mutilated gears adapted to enter the slots and engage with the threads on the interior of the outer cylinder, a pointer pivoted in fixed relation to said lens tube and adapted to engage with an inclined slot in the lens tube, whereby the adjustment of the said tube will move the pointer to indicate the adjustment of the lens.

5. A system of lenses for motion picture cameras, comprising in combination, a finder and an objective lens mounted side by side, lens holding tubes, inner cylinders with which they fit, outer cylinders internally threaded surrounding and secured to the inner cylinders, mutilated gears on the lens tubes entering slots in the inner cylinders and engaging the threads on the outer cylinders, and gearing between the outer cylinders of the two lens holders whereby the rotation of one effects a simultaneous and similar adjustment of both lenses.

6. Any form of adjustable lens holder, which comprises in combination, an inner cylinder 7, a surrounding internally threaded cylinder 10, and a lens holding tube with exterior mutilated gears engaging through openings in the cylinder 7 with the threads in the cylinder 10.

In testimony whereof I hereunto affix my signature.

CARL E. AKELEY.